(No Model.)
E. C. ZUMWALT.
STOVE MAT FOR COFFEE POTS OR OTHER UTENSILS.
No. 246,271.  Patented Aug. 23, 1881.
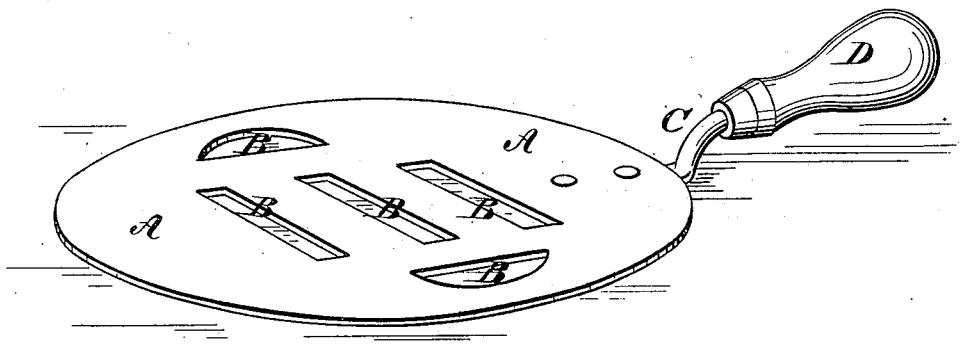

UNITED STATES PATENT OFFICE.

ELIZABETH C. ZUMWALT, OF PORT ORFORD, OREGON.

STOVE-MAT FOR COFFEE-POTS AND OTHER UTENSILS.

SPECIFICATION forming part of Letters Patent No. 246,271, dated August 23, 1881.

Application filed January 24, 1881. (No model.)

*To all whom it may concern:*

Be it known that I, ELIZABETH CAROLINE ZUMWALT, of Port Orford, Curry county, Oregon, have invented a new and useful Improvement in Stove-Mats for Coffee-Pots and other Utensils, of which the following is a specification.

The figure is a perspective view of the improvement.

The object of this invention is to prevent the bottoms of coffee-pots and other utensils from being worn or injured by moving the utensils about upon a stove.

The invention consists in a mat constructed of a plate of sheet metal, having apertures and a handle to adapt the mat to be placed upon the top of a stove to receive a coffee-pot or other utensil, as will be hereinafter fully described.

A is a circular plate of sheet-iron, of such a size as to allow a coffee-pot or other utensil to be set upon it. The plate A has slots or apertures B formed through it, to allow the heat from the stove to come into direct contact with the bottom of the utensil standing upon the plate A.

Upon the plate A, at one side, is formed, or to it is attached, a handle, C, which rises a little above the plane of the plate A, so that the hand that grasps it will not come in contact with the top of the stove. The handle C may be provided with a hand-piece, D, of wood or other material that is a non-conductor of heat.

In using the mat, it is placed upon the top of a stove and the coffee-pot or other utensil is placed upon it, so that the utensil can be moved from place to place by sliding the mat upon the top of the stove. In this way the bottom of the coffee-pot or other utensil is protected from being worn by contact with the top of the stove.

Having thus described my invention, I claim as new and desire to secure by Letters Patent—

A coffee-pot mat consisting of the metallic plate A, having the holes B, the shank C, and the handle D, as shown and described.

ELIZABETH CAROLINE ZUMWALT.

Witnesses:
ASA CARMAN,
J. B. TICHENOR.